United States Patent [19]

Ryoke et al.

[11] Patent Number: 4,552,799

[45] Date of Patent: Nov. 12, 1985

[54] MAGNETIC RECORDING MEDIUM

[75] Inventors: Katsumi Ryoke; Shinobu Iida; Masaaki Fujiyama; Eiichi Tadokoro, all of Kanagawa, Japan

[73] Assignee: Fuji Photo Film Co., Ltd., Kanagawa, Japan

[21] Appl. No.: 602,985

[22] Filed: Apr. 23, 1984

[30] Foreign Application Priority Data

Apr. 21, 1983 [JP] Japan ................................ 58-70605

[51] Int. Cl.$^4$ .............................................. G11B 5/72
[52] U.S. Cl. ..................................... 428/194; 360/134; 427/128; 427/131; 428/219; 428/340; 428/694; 428/695; 428/900
[58] Field of Search ............... 428/694, 695, 202, 192, 428/44, 130, 408, 194, 219, 340, 900; 427/131, 128; 360/134–136

[56] References Cited

U.S. PATENT DOCUMENTS

| 3,041,196 | 6/1962 | Stella | 428/192 |
|---|---|---|---|
| 3,042,639 | 7/1962 | Adams . | |
| 3,347,362 | 10/1967 | Rabuse | 428/194 |
| 3,387,993 | 6/1968 | Flowers . | |
| 3,470,021 | 9/1969 | Hendricx . | |
| 3,476,596 | 11/1969 | Carroll | 428/695 |
| 3,625,760 | 12/1971 | Slovinsky | 117/235 |
| 3,634,253 | 1/1972 | Akashi . | |
| 3,833,412 | 9/1974 | Akashi | 117/240 |
| 4,135,031 | 1/1979 | Akoshi | 428/694 |
| 4,322,474 | 3/1982 | Matsuura | 428/694 |
| 4,361,621 | 11/1982 | Isobe | 428/329 |
| 4,407,853 | 4/1982 | Okita | 427/44 |

Primary Examiner—Ellis P. Robinson
Attorney, Agent, or Firm—Sughrue, Mion, Zinn, Macpeak and Seas

[57] ABSTRACT

A magnetic recording medium comprised of a non-magnetic support base having provided thereon a magnetic recording layer is disclosed. The medium also has position thereon a compound selected from the group consisting of carboxylic acids and carboxylic acid derivatives, the compound being present on an edge portion of the medium. The medium also includes an additional lubricant on the middle part of the medium, the additional lubricant being selected from the group consisting of alphatic acid esters, alphatic acids, silicons and phosphoric acid esters. By utilizing two different types of lubricants on different portions of the medium it is possible to obtain improved lubricating properties and thus improve runnability with respect to the operation of the magnetic recording medium.

11 Claims, 1 Drawing Figure

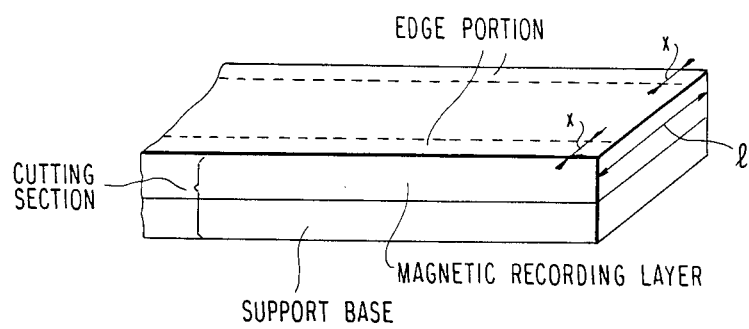

MAGNETIC RECORDING MEDIUM

FIELD OF THE INVENTION

The present invention relates to a magnetic recording medium and, more specifically, to a magnetic recording medium in which friction characteristics of the magnetic layer are controlled so that it brings about less audio output variation or which does not readily generate inferior control tracking.

BACKGROUND OF THE INVENTION

In recent years, magnetic recording/reproducing machines have been widely used. Accordingly, inferior adjustment of the magnetic recording medium running system often takes place with magnetic recording/reproducing machines.

When the axes of a magnetic recording/reproducing machine, which are placed on the running passage for the magnetic recording medium (such as a feed reel axis, a tension stabilizer guide axis, a revolving head cylinder axis, a pinch roller axis, a capstan axis, a running guide axis or a winding reel axis, etc.) cause a minute warp at the normal axis position, the magnetic recording medium suffers minute damage. This damage can increase the audio output variation, if the magnetic recording medium is allowed to run in such a magnetic recording-/reproducing machine. Further, damage is formed in control tracking for controlling rotation of the video head (namely, the control tracking is damaged so that the servomechanism does not operate normally)which causes jitter and time base errors, etc. This minute damage in the magnetic recording medium generally causes audio output variation and inferior tracking control over the passage of time. As a result, creases like seaweed and formed on the edges and end parts in the width direction of the magnetic recording medium.

Hitherto, the audio output variation and/or the inferior tracking control was improved by reducing the friction coefficient of the magnetic recording medium, namely, by improving the surface lubricating property, as described in Japanese Patent Application (OPI) Nos. 154632/82, 119930/81, 124122/81 and 124126/81 (the term "OPI" as used herein refers to a "published unexamined Japanese patent application"). In order to improve the surface lubricating property, a desired lubricant was uniformly blended and/or dispersed in a coating solution and applied to a polyester base. Alternatively, the lubricant was dissolved in a solvent and applied as an overcoating layer to the surface of the polyester base to which the coating solution had been applied and/or the back thereof.

As the lubricant, aliphatic acids and/or aliphatic acid esters having a melting point of 100° C. or less, etc., were used. However, it was difficult to obtain magnetic recording media having sufficient characteristics, even though these additives were used. Furthermore, when these additives were used in a large amount in order to increase the lubricating effect, mechanical strength of the recording layer sometimes deteriorated.

Thus, as a result of analyzing in order to improve the audio output variation and/or the inferior tracking control of the magnetic recording medium, the present inventors have found that it could be attained by improving ununiform running tension in the width direction of the magnetic recording medium and by controlling the friction characteristics of the edges and cutting section of the magnetic recording medium. These facts indicate that the audio output variation and the inferior tracking control cannot be improved, even if the surface lubricating property of the magnetic recording medium is improved.

Namely, in studying the magnetic recording/reproducing machine in detail, it is understood that the surface and the cutting section of the magnetic layer in the magnetic recording medium pass in contact with various kinds of material. Further, it is very difficult to give a good lubricating property for all materials with respect to the surface of the magnetic layer using the same lubricant, though it is applied to the same surface of the magnetic layer. Namely, the magnetic face of the magnetic recording medium generally runs in contact with an audio head and a control head in the edge portions thereof and with a video head in the central part thereof. Further, the edge portions of the magnetic face runs in contact with various kinds of materials such as a stainless guide pole, a flange, ceramics, synthetic resins, aluminum alloys, resin processed goods, etc. Namely, in order to give a satisfactory lubricating property for such materials to the magnetic recording medium, it is possible to properly use a lubricant suitable for materials contacting with the surface of said magnetic layer. The present inventors have now found that the lubricating property suitable for contacting materials can be obtained by applying a carboxylic acid or a carboxylic acid derivative to both edge portions or one edge portion of the surface of the magnetic layer in the magnetic recording medium and applying, for example, aliphatic acids, aliphatic acid esters, silicone, phosphoric acid esters, etc., to the central part.

SUMMARY OF THE INVENTION

An object of the present invention is to provide a magnetic recording medium having less audio output variation.

Another object is to provide a magnetic recording medium in which the inferior tracking control is improved.

Yet another object of the present invention is to provide a magnetic recording medium having good running characteristics.

Still another object is to provide a magnetic recording medium having good sensitivity.

Another object is to provide a novel method of adding a lubricant to the magnetic recording medium.

The objects of the present invention are attained by providing a magnetic recording medium which is characterized in that a carboxylic acid or a carboxylic acid derivative such as acyl halides, amide acids and carboxylic acid salts is present in at least one edge portion on the surface of the magnetic layer in the magnetic recording medium.

BRIEF DESCRIPTION OF THE DRAWING

The Figure shows the edge portion wherein the carboxylic acid or a carboxylic acid derivative is present.

DETAILED DESCRIPTION OF THE INVENTION

As used herein, the term "edge portion" designates areas on the exposed surface of the magnetic layer extending inwardly from the lateral edges of the magnetic layer, as shown in the Figure. The ratio of the width of the edge portion (x) to the width of the magnetic layer (l) is preferably not more than 3/20.

Typical examples of the carboxylic acids and carboxylic acid derivatives used in the present invention are represented by the following general formulae (I) and (II).

$$R_1—COX_1 \quad (I)$$

$$X_2OC—R_2—COX_3 \quad (II)$$

wherein $X_1$, $X_2$ and $X_3$ each represents a hydroxyl group, a halogen atom, an amino group, an alkylamino group or the group —OM (wherein M represents a metal atom); $R_1$ represents an aromatic group preferably having 6 to 22 carbon atoms (more preferably 6 to 15 carbon atoms), an alkyl group preferably having 3 to 22 carbon atoms (more preferably 12 to 18 carbon atoms), an alkenyl group preferably having 3 to 22 carbon atoms (more preferably 12 to 18 carbon atoms), an oxyalkyl group preferably having 3 to 22 carbon atoms (more preferably 12 to 18 carbon atoms) and an aminoalkyl group preferably having 3 to 22 carbon atoms (more preferably 10 to 18 carbon atoms; and $R_2$ represents a divalent aromatic group preferably having 6 to 10 carbon atoms (more preferably 6 carbon atoms), an alkylene group preferably having 3 to 22 carbon atoms (more preferably 3 to 10 carbon atoms) and an oxyalkylene group preferably having 3 to 22 carbon atoms (more preferably 3 to 10 carbon atoms.

Examples of compounds represented by the general formulae (I) and (II) include the following, and Compounds A-1 to A-4 and A-8 are preferably used.

| | |
|---|---|
| A-1 | $C_{11}H_{23}COOH$ |
| A-2 | $C_{13}H_{27}COOH$ |
| A-3 | $C_{15}H_{31}COOH$ |
| A-4 | $C_{17}H_{35}COOH$ |
| A-5 | $C_{19}H_{39}COOH$ |
| A-6 | $C_{21}H_{43}COOH$ |
| A-7 | $C_5H_{11}COOH$ |
| A-8 | $C_{17}H_{33}COOH$ (oleic acid) |
| A-9 | $C_{17}H_{33}COOH$ (elaidic acid) |
| A-10 | $C_{17}H_{31}COOH$ (linolic acid) |
| A-11 | $HOOC—CH_2—CO(OH)—CH_2—COOH$ |
| A-12 | $C_{16}H_{11}COOH$ |
| A-13 | $CH_3(CH_2)_4CONH_2$ |
| A-14 | $CH_3(CH_2)_{10}CONH_2$ |
| A-15 |  |
| A-16 | 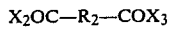 |
| A-17 | Naphthenic acid |
| A-18 | 12-hydroxystearic acid |
| A-19 | Edetic acid (EDTA) |
| A-20 | Phthalic acid |
| A-21 | Glutaric acid |

Carboxylic acids and carboxylic acid derivatives represented by the general formulae (I) and (II) may be used as a mixture with other compounds as long as the carboxylic acid or carboxylic acid derivative contains in an amount of 50 wt % or more, the other compounds being capable of distributing the melting point of the carboxylic acid or carboxylic acid derivative. Examples of useful mixtures include the following, and B-1 to B-5 and B-7 to B-12 are preferably used.

B-1: Castor oil
B-2: Soybean oil
B-3: Rapeseed oil
B-4: Rice bran oil
B-5: Cotton seed oil
B-6: Coconut oil
B-7: Palm oil
B-8: Sesame oil
B-9: Sunflower oil
B-10: Corn oil
B-11: Peanut oil
B-12: Olive oil Carboxylic acids and carboxylic acid derivatives used in the present invention are not limited to the above described compounds, and the composition and the mixing ratio can be suitably selected.

Further, examples of carboxylic acids and carboxylic acid derivatives available in the market used in the present invention include the following.

C-1: Stearic acid ("NAA 170" produced by Nippon Oils and Fats Co.)
C-2: Oleic acid ("NAA 34" produced by Nippon Oils and Fats Co.)
C-3: Lauric acid ("NAA 312" produced by Nippon Oils and Fats Co.)
C-4: Capronic acid ("NAA 60" produced by Nippon Oils and Fats Co.)
C-5: Myristic acid ("NAA 141" produced by Nippon Oils and Fats Co.)

These carboxylic acids or derivatives thereof are applied to the edge portions of the magnetic recording medium as they are or as a state of being diluted with a solvent by means of a brush, nonwoven cloth, cotton cloth, urethane foam or foamed styrene resin, etc. Alternatively, these compounds may be applied by the same means as above to cutting section of the magnetic recording medium thereby to exude onto the edge portions. Further, they may be attached to the cutting section by means of spraying, etc.

The carboxylic acid or derivatives thereof used in the present invention are preferred to have a viscosity of 1 to 1,000 cp (25° C.). However, even if they have a viscosity higher than the above described range, they can be practically used, if the viscosity of them is reduced to 1,000 cp or less by diluting with a suitable solvent. Any solvent can be used for the purpose as long as they do not damage the support base. Examples of solvent include acetic acid esters (e.g., methyl acetate and butyl acetate), ketones (e.g., methyl ethyl ketone and acetone), alkanes (e.g., n-hexane), alcohols (e.g., methanol and ethanol) and aromatic compounds.

To a high polymer base, a magnetic solution is applied or a magnetic solution and a backing solution are applied. After having carried out orientation and drying, an operation for making a mirror face and/or an operation for hardening is carried out, and the coated base is cut into a desired width. The cutting width can be suitably selected from, for example, 2 inches, 1 inch, ¾ inch, ½ inch, ¼ inch and 8 mm, etc.

The coating amount of the carboxylic acids or derivatives thereof is generally provided on the edge portion(s) of the surface of the magnetic layer in an amount of 0.2 to 1,000 mg/m², preferably 0.4 to 500 mg/m² and more preferably 2 to 100 mg/m².

In the case that the carboxylic acids or derivatives thereof are applied to the cutting section of the magnetic recording medium, the coating amount of the compounds can be suitably selected from a range of 0.01 to 500 g/m² based on the cutting section according to cutting width, thickness of the high polymer base (e.g., 6–50 μm) of the magnetic recording medium, thickness of the undercoating layer, thickness of the magnetic layer (e.g., 1 to 10 μm), thickness of the undercoating layer of the backing layer, and thickness of the backing layer (e.g., 0.5 to 3 μm). More preferably, the coating amount is in a range of 0.01 to 100 g/m². In general, the coating amount may be small when the base and magnetic layer are thin and the carboxylic acid or derivative thereof has high exudation property. If the amount of the carboxylic acid or derivative thereof is too large, the above described effect is difficult to obtain, because they uniformly exude onto the entire surface of the magnetic layer. While the degree of exudation depends upon the molecular weight and melting point of the carboxylic acids or derivatives thereof and the coating amount, but is is not preferred to exceed a coating amount of 500 g/m². Further, these compounds preferably have a melting point of 150° C. or less, more preferably 20° to 100° C.

According to the present invention, a magnetic recording medium having different lubricating properties between the edge portion(s) and the central part of the surface of magnetic layer can be obtained. The central part may also be coated with conventional lubricants other than the carboxylic acids or derivatives thereof of the present invention, such as aliphatic acids, aliphatic acid esters, silicone, phosphoric acid esters, etc., aliphatic acids having 12 to 18 carbon atoms being preferably used for the purpose. Further, it is possible to uniformly add such lubricants in the magnetic layer, as described in Japanese Patent Application (OPI) Nos. 53402/74, 92101/75 and 10603/75 and Japanese Patent Publication Nos. 28367/64, 18064/66, 6427/67, 15007/73, 15624/72, 18063/66 and 12950/72. The amount of lubricants coated or added is preferably from 0.3 to 2.0 g per 100 g of ferromagnetic powders dispersed in the magnetic layer.

In the present invention, conventional ferromagnetic powders, additives and bases (which may have an undercoating layer or a backing layer) and a conventional method of making a magnetic recording medium can be used as described in, for example, Japanese Patent Publication No. 26890/81 and U.S. Pat. No. 4,135,016.

In the following, the present invention is illustrated in greater detail with reference to examples. However, the scope of the invention is not limited to the examples. In the examples, "part" means "part by weight".

EXAMPLE 1

After the following composition was sufficiently kneaded in a ball mill, 35 parts of polyisocyanate compound (trade name "Desmodur L-75" produced by Bayer Co.) was added thereto and uniformly dispersed therein to prepare a magnetic coating.

| | parts |
|---|---|
| γ-Fe₂O₃ powder | 300 |
| Vinyl chloride-vinyl acetate copolymer (polymerization ratio: 87/13, degree of polymerization: about 400) | 30 |
| Epoxy resin (epoxy group content: 0.56) | 30 |
| Carbon black (average particle size: 80 mμ) | 5 |
| Ethyl acetate | 250 |
| Cyclohexanone | 250 |

After the viscosity of this magnetic coating was adjusted with isophorone, it was applied to a surface of a polyester base film and dried to obtain a magnetic layer having a thickness of 4 μm.

After the resulting tape was subjected to mirror face treatment, it was cut into ½ inch widths to obtain two samples. One of the resulting samples was called Sample No. 1. To the both cutting sections of the other sample, a 10 wt % solution of Compound A-4 in benzene was applied in an amount of 30 g/m² (for each cutting section) to obtain Sample No. 2.

COMPARATIVE EXAMPLE 1

10 parts of Compound A-4 was added to the same composition as in Example 1 and put into a ball mill. After sufficiently kneaded, 35 parts of "Desmodur L-75" was added and uniformly dispersed by mixing. Application was carried out in the same manner as in Example 1, and the film was cut into ½ inch widths to obtain Sample No. 3.

Results of measuring characteristics of Sample Nos. 1 to 3 are shown in Table 1.

TABLE 1

| Sample No. | Variation of Sound Output (dB) |
|---|---|
| 1 (Comparative Example) | 5.7 |
| 2 (Example) | 0.3 |
| 3 (Comparative Example) | 2.2 |

The method of measuring the characteristics in Table 1 and the criterion for judging thereof are shown in the following.

Variation of sound output was measured by adjusting a guide pole axis in the deck for magnetic recording/reproduction so as to shift 15° from the normal axis position to the running direction of the magnetic recording medium, and repeatedly running the tape 300 times under such a condition. Thereafter, a sine-wave signal of 1 KHz was recorded on the whole length of the sample at a normal input level using a prescribed bias current. Then, a reproduction level was recorded by a recorder, and the maximum value of the output variation was read on a recording paper and it was represented as dB.

Table 1 shows that the sample in which Compound A-4 was applied to the cutting sections had excellent characteristics with respect to variation of sound output. In Sample No. 3, it is supposed that the lubricant added to the magnetic layer face does not sufficiently function on the cutting section.

COMPARATIVE EXAMPLE 2

50 parts of Compound A-4 was added to a magnetic coating by the same manner as in Comparative Example 1 to produce a tape, which was called Sample No. 4.

The results of comparing the characteristics of Sample Nos. 2 and 4 are shown in Table 2.

TABLE 2

| Sample No. | Variation of Sound Output (dB) | Reproduction RF Output (dB) | Surface Property |
|---|---|---|---|
| 2 (Example) | 0.3 | 0 | A |
| 4 (Comparative Example) | 0.3 | −2.1 | B |

Variation of sound output in Table 2 was measured in the same manner as in Table 1.

Reproduction RF output was represented as relative dB of the output when carrying out recording and reproduction of 4 MHz.

Surface properties were determined visually by means of a microscope. B means that alien substances were observed on the surface of the magnetic layer and A indicates a normal state.

Table 2 shows that if the compound is added to the magnetic coating in an amount sufficient to improve the variation of sound output, the reproduction RF output deteriorates and alien substances are observed on the surface of the magnetic recording medium.

EXAMPLE 2

After the following compositions were sufficiently kneaded in a ball mill, 40 parts of "Desmodur L-75" was added thereto and uniformly dispersed by mixing to prepare magnetic coatings.

| | parts |
|---|---|
| γ-$Fe_2O_3$ powder | 300 |
| Vinyl chloride-vinyl acetate-maleic acid-vinyl alcohol copolymer | 40 |
| Epoxy resin | 25 |
| Carbon black (average particle size: 23 mμ) | 10 |
| Nitrocellulose | 10 |
| Lecithin | 5 |
| Oleic acid | 5 |
| Compound A-1 | (shown in Table 3) |
| Ethyl acetate | 400 |
| Cyclohexanone | 200 |

These magnetic coatings were applied to the surface of polyester base films and dried to prepare magnetic tapes.

They were subjected to mirror face treatment in the same manner as in Example 1 and cut into 1 inch widths to obtain Sample Nos. 5 to 9. Sample Nos. 8 and 9 were prepared respectively by applying 3 g/m² and g/m² of Compound A-1 to the both cutting sections, while Sample No. 7 included none of Compound A-1.

The results of comparing characteristics of Sample Nos. 5, 6, 7, 8 and 9 are shown in Table 3. Methods of measurement were the same as those described in Tables 1 and 2.

TABLE 3

| Sample No. | Amount of Compound A-1 | Variation of Sound Output (dB) | Reproduction RF Output (dB) |
|---|---|---|---|
| (Comparative Example) | | | |
| 5 | 40 parts | 0.2 | −1.1 |
| 6 | 4 parts | 1.6 | +0.2 |
| 7 | 0 part | 2.1 | 0 |
| (Example) | | | |
| 8 | 3 g/m² | 0.2 | 0 |
| 9 | 30 g/m² | 0 | −0.2 |

This example shows that even when using a composition similar to a practical system, the application of at least one kind of carboxylic acid or carboxylic acid derivative to the edge portions is very effective for improving both the variation of sound output and the reproduction RF output.

EXAMPLE 3

After the following compositions were sufficiently kneaded in a ball mill, 25 parts of "Desmodur L-75" was added thereto and uniformly dispersed by mixing to obtain magnetic coatings.

| | parts |
|---|---|
| Co—Ni—Fe alloy powder (specific surface area: 50 m²/g) | 300 |
| Nitrocellulose | 50 |
| Polyurethane (molecular weight: about 30,000) | 20 |
| Abrasive ($Cr_2O_3$) | 20 |
| Benzotriazole | 1 |
| Compound C-1 | (shown in Table 4) |
| Butyl laurate | 3 |
| Carbon black (average particle size: 115 mμ) | 15 |
| Methyl ethyl ketone | 300 |
| Ethyl acetate | 150 |
| Toluene | 150 |

After tapes were produced as in Example 2, they were cut into ½ inch widths to produce Sample Nos. 10 and 11. A sample to which Compound C-1 was not added was called Sample No. 12. Samples prepared by applying 2 g/m² and 20 g/m² of Compound C-1 to the cutting section of Sample No. 12 respectively were called Sample Nos. 13 and 14.

The reproduction RF output and the variation of sound output were measured by the same methods as in Examples 1 and 2.

Measurements were determined using a deck for VHS available in the market in the same manner with adjusting the guide pole axis of the running system as shown in Example 1, except that the video head and the audio head in the video deck were replaced with those for high coercive force.

TABLE 4

| Sample No. | Amount of Compound C-1 | Variation of Sound Output (dB) | Reproduction RF Output (dB) |
|---|---|---|---|
| (Comparative Example) | | | |
| 10 | 45 parts | 0.5 | −1.8 |
| 11 | 4.5 parts | 2.8 | +0.3 |
| 12 | 0 part | 3.3 | 0 |
| (Example) | | | |
| 13 | 2 g/m² | 0.1 | 0 |
| 14 | 20 g/m² | 0 | −0.2 |

It is also understood from this example that addition of at least one kind of carboxylic acid or carboxylic acid derivative to the edge portions is remarkably effective for improving both the variation of sound output and the reproduction RF output.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support base having provided thereon a magnetic recording layer comprised of ferromagnetic particles dispersed in a binder wherein a compound selected from the group consisting of carboxylic acids and carboxylic acid derivatives is applied only to a cutting section of the recording medium to exude on an edge portion of the surface of the magnetic recording layer, wherein the compound selected from the group consisting of carboxylic acids and carboxylic acid derivatives is applied to the cutting section of the recording medium in an amount in the range of 0.01 to 500 g/m².

2. A magnetic recording medium as claimed in claim 1, wherein the medium is further comprised of an additional lubricant on the middle portion of the surface of the magnetic recording layer, the additional lubricant containing at least one compound which is different from the compound applied to the cutting section of the recording medium, and being selected from the group consisting of aliphatic acid esters, aliphatic acids, silicone and phosphoric acid esters, whereby different lubricating properties between the middle portion and the cutting section are obtained.

3. A magnetic recording medium as claimed in claim 1, wherein the compound selected from the group consisting of carboxylic acids and carboxylic acid derivatives is a compound represented by the general formula (I) or (II):

$$R_1-COX_1 \tag{I}$$

$$X_2OC-R_2-COX_3 \tag{II}$$

wherein $X_1$, $X_2$ and $X_3$ each represents a hydroxyl group, a halogen atom, an amino group, and alkylamino group or the —OM group wherein M represents a metal atom; $R_1$ represents an aromatic group having 6 to 22 carbon atoms, an alkyl group having 3 to 22 carbon atoms, an alkenyl group having 3 to 22 carbon atoms, an oxyalkyl group having 3 to 22 carbon atoms, or an aminoalkyl group having 3 to 22 carbon atoms; and $R_2$ represents a divalent aromatic group having 6 to 10 carbon atoms, an alkylene group having 3 to 22 carbon atoms or an oxyalkylene group having 3 to 22 carbon atoms.

4. A magnetic recording medium as claimed in claim 1, wherein the compound is applied to the cutting section of the recording medium in an amount in the range of 0.01 to 100 g/m².

5. A magnetic recording medium as claimed in claim 4, wherein the compound selected from the group consisting of carboxylic acids and carboxylic acid derivatives has a melting point of less than 150° C.

6. A magnetic recording medium as claimed in claim 5, wherein the compound selected from the group consisting of carboxylic acids and carboxylic acid derivatives has a melting point of 20° to 100° C.

7. A magnetic recording medium as claimed in claim 1, wherein the compound selected from the group consisting of carboxylic acids and carboxylic acid derivatives is present on the edge portion in an amount of 0.2 to 1,000 mg/m².

8. A magnetic recording medium as claimed in claim 1, wherein the magnetic recording layer covers the complete surface of the non-magnetic support base.

9. A magnetic recording medium as claimed in claim 1, wherein the ratio of the width of the edge portion of the width of the magnetic layer is not more than 3/20.

10. A magnetic recording medium as claimed in claim 1, which is an audio magnetic recording medium.

11. A magnetic recording medium as claimed in claim 1, which is a video magnetic recording medium.

* * * * *